United States Patent
Ueba et al.

(10) Patent No.: US 10,826,390 B2
(45) Date of Patent: Nov. 3, 2020

(54) POWER SUPPLY AND IMAGE FORMING APPARATUS INCORPORATING SAME

(71) Applicants: Ryohta Ueba, Kanagawa (JP); Keita Maejima, Kanagawa (JP)

(72) Inventors: Ryohta Ueba, Kanagawa (JP); Keita Maejima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 117 days.

(21) Appl. No.: 16/195,705

(22) Filed: Nov. 19, 2018

(65) Prior Publication Data
US 2019/0199211 A1 Jun. 27, 2019

(30) Foreign Application Priority Data
Dec. 25, 2017 (JP) .................. 2017-247519

(51) Int. Cl.
*H02M 3/156* (2006.01)
*H02M 1/32* (2007.01)
*G03G 15/00* (2006.01)

(52) U.S. Cl.
CPC ............ *H02M 3/156* (2013.01); *G03G 15/80* (2013.01); *H02M 1/32* (2013.01)

(58) Field of Classification Search
CPC .......................... H02M 3/158; H02M 3/33507
See application file for complete search history.

(56) References Cited

U.S. PATENT DOCUMENTS

| | | | |
|---|---|---|---|
| 2007/0014129 A1* | 1/2007 | Inukai | H02M 3/33515 363/21.01 |
| 2007/0071478 A1* | 3/2007 | Hong | G03G 15/80 399/88 |
| 2008/0013981 A1* | 1/2008 | Kimura | G03G 15/2064 399/96 |
| 2011/0274449 A1* | 11/2011 | Mine | G03G 15/205 399/33 |
| 2017/0346313 A1* | 11/2017 | Yao | H02J 7/0029 |
| 2019/0086978 A1* | 3/2019 | Humphrey | G06F 1/28 |

FOREIGN PATENT DOCUMENTS

| | | |
|---|---|---|
| JP | 2005-256617 | 9/2005 |
| JP | 2009-069042 | 4/2009 |
| JP | 2010-004658 | 1/2010 |
| JP | 2011-061983 | 3/2011 |
| JP | 2011-191643 | 9/2011 |
| JP | 2012-060723 | 3/2012 |
| JP | 2012-199028 | 10/2012 |
| JP | 2014-002265 | 1/2014 |
| JP | 2015-043013 | 3/2015 |

* cited by examiner

*Primary Examiner* — Fred E Finch, III
*Assistant Examiner* — Rafael O De Leon Domenech
(74) *Attorney, Agent, or Firm* — Duft & Bornsen, PC

(57) ABSTRACT

A power supply includes a transformer configured to transform a direct current (DC) voltage and supply an output voltage to a load. The power supply further includes circuitry configured to control the output voltage from the transformer, compare one of an average per unit time of the output voltage and an amplitude value of the output voltage with a threshold in a failure-free state when performing droop control of the output voltage, and determine whether a failure has occurred in at least one of the load and the transformer.

11 Claims, 11 Drawing Sheets

POWER SUPPLY 10

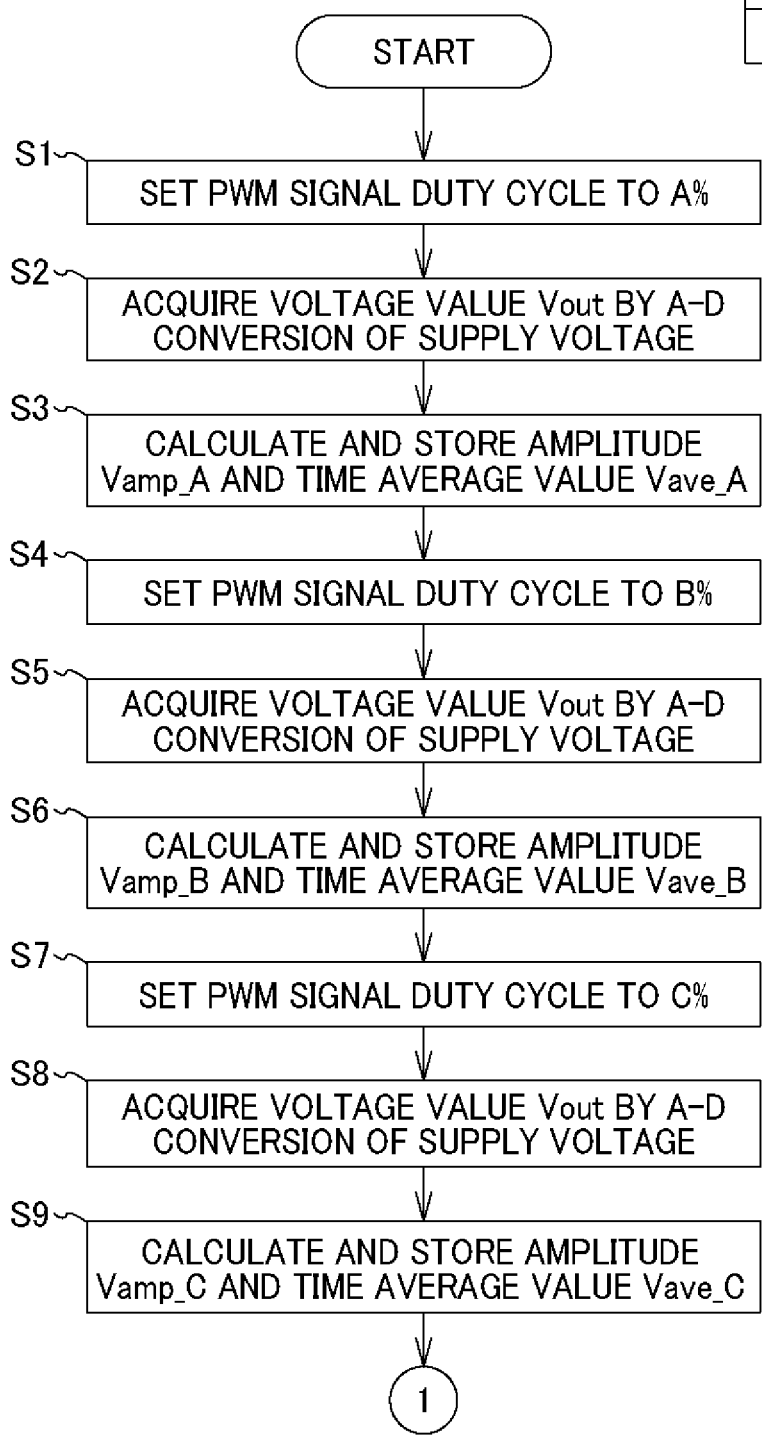

POWER SUPPLY AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application No. 2017-247519, filed on Dec. 25, 2017, in the Japan Patent Office, the entire disclosure of which is hereby incorporated by reference herein.

BACKGROUND

Technical Field

This disclosure generally relates to a power supply and an image forming apparatus, such as a copier, a printer, a facsimile machine, or a multifunction peripheral (MFP) having at least two of copying, printing, facsimile transmission, plotting, and scanning capabilities, that incorporates the power supply.

Description of the Related Art

In a system that uses a direct current (DC) to DC converter (DC-DC converter) to transform and control voltage to be supplied to a load (e.g., a cooling fan), when a failure occurs in an electronic component of a power supply circuit, an appropriate voltage is not supplied to the load. To avoid such an inconvenience, there are techniques to determine the failure of electronic components.

There is a technique of measuring changes in an output current and an output voltage in a transformation unit of a DC-DC converter and comparing the change with a threshold to determine a failure of a circuit component.

SUMMARY

According to an embodiment of this disclosure, a power supply includes a transformer configured to transform a direct current voltage and supply an output voltage to a load. The power supply further includes circuitry configured to control the output voltage from the transformer, compare one of an average per unit time of the output voltage and an amplitude value of the output voltage with a threshold in a failure-free state when performing droop control of the output voltage, and determine whether a failure has occurred in at least one of the load and the transformer.

According to another embodiment, an image forming apparatus includes a load to which voltage is supplied and a power supply including a transformer configured to transform a DC voltage and supply an output voltage to the load. The image forming apparatus further includes the circuitry described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 9A, 9B, and 9C (FIG. 9) are flowcharts of processing performed by a direct current to direct current (DC-DC) converter serving as a power supply according to an embodiment.

Figure 1:
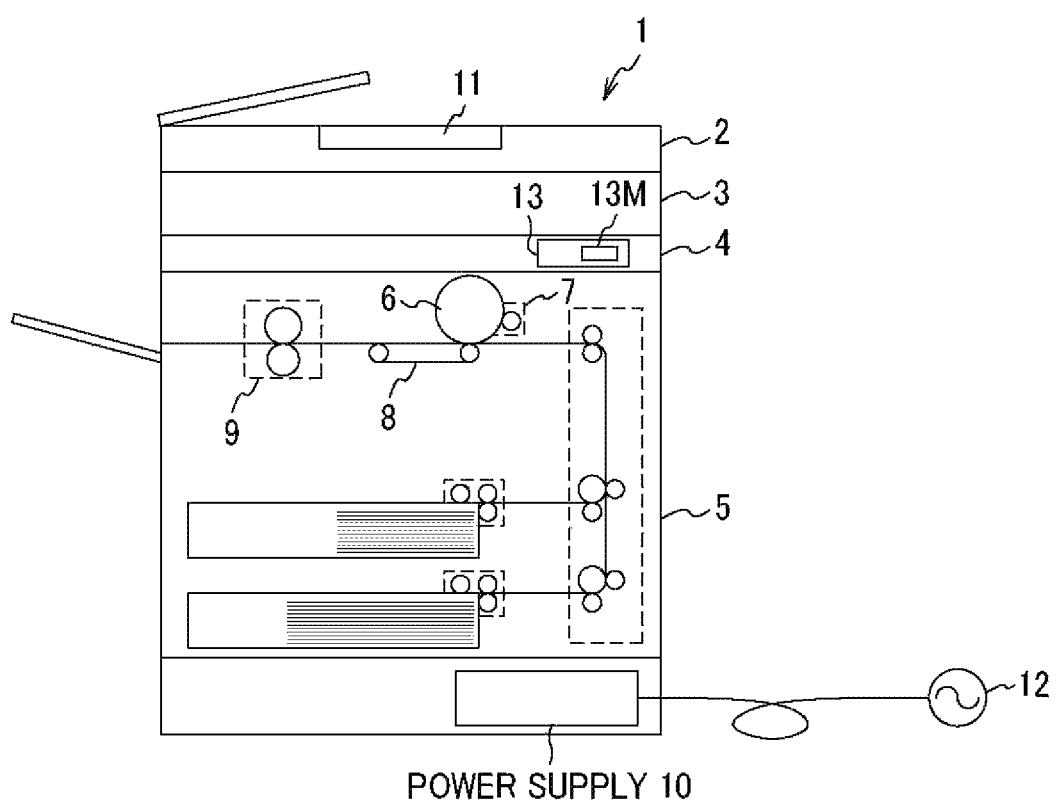
FIG. 1 is a schematic cross-sectional view of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an image forming apparatus according to an embodiment of this disclosure is described. As used herein, the singular forms "a", "an", and "the" are intended to include the plural forms as well, unless the context clearly indicates otherwise.

Image Forming Apparatus

FIG. 1 is a schematic view of an image forming apparatus 1 according to an embodiment of the present disclosure.

The image forming apparatus 1 illustrated in FIG. 1 is a digital multifunction peripheral (MFP) and has a copy function, a printer function, a facsimile function, and the like.

In the image forming apparatus 1, a user can select the function while sequentially switching from, for example, the copy function to the printer function and to the facsimile function, with an application switching key of a control panel 11 (i.e., an operation display device). The user selects the copy function to set the apparatus in a copy mode, selects the printer function to set the apparatus in a printer mode, and select the facsimile function to set the apparatus in a facsimile mode.

Referring to FIG. 1, a brief description will be given of an operation flow of copying as an example of image formation in the image forming apparatus 1.

In the copying, an automatic document feeder (ADF) 2 sequentially feeds a bundle of documents to an image reading unit 3 sheet by sheet, and the image reading unit 3 reads image data from each document. A writing unit 4 converts, via an image processor, the image data read from the documents to optical data. Then, inside a printer body 5, a charger uniformly charges a photoconductor drum 6, and an exposure device exposes the photoconductor drum 6 based on the optical data from the writing unit 4, thereby forming an electrostatic latent image.

A developing device 7 develops the electrostatic latent image on the photoconductor drum 6 into a visible toner image. Then, the toner image is transferred via a conveyor belt 8 onto a transfer sheet. A fixing device 9 fixes the toner image on the transfer sheet, after which the transfer sheet is discharged.

Thus, the image forming apparatus 1 includes devices (loads) to which power is to be supplied. The image forming apparatus 1 includes a power supply 10 to convert power supplied from an external power supply 12, which is an alternating-current (AC) power supply, into DC power. The power supply 10 supplies the DC power to the above-described loads, a cooling fan 13 of the writing unit 4, and the like.

The control panel 11 includes a plurality of keys and a liquid crystal display (LCD) panel for displaying messages.

The control panel 11 displays a plurality of operation modes relating to the loads according to the data from a control unit 40, accepts designation of any one of the plurality of operation modes, and outputs the designation to the control unit 40. The control unit 40 can be either of the power supply 10 and the image forming apparatus 1.

In the present embodiment, the image forming apparatus 1 is a target apparatus, but, alternatively, a personal computer, a projector, an electronic whiteboard, or the like can be the target to which aspects of disclosure are applied.

Power Supply

Figure 2:
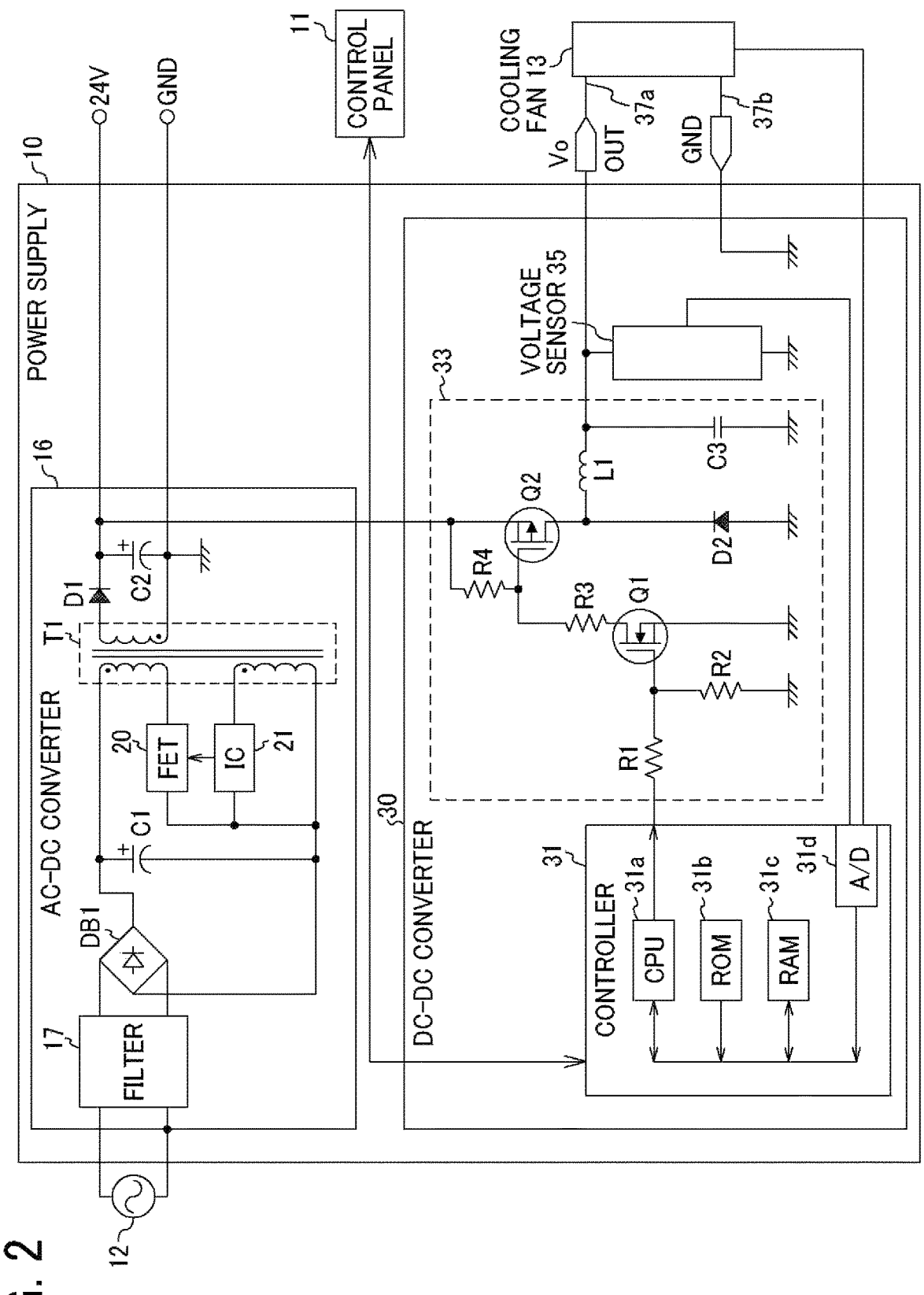
FIG. 2 is a block diagram including a circuit diagram of a power supply system of a power supply illustrated in FIG. 1.

FIG. 2 is a block diagram including power supply circuitry of the power supply 10 illustrated in FIG. 1.

The power supply 10 includes an alternating current to direct current (AC-DC) converter 16 and a DC-DC converter 30.

AC-DC Converter

In the AC-DC converter 16, as the AC voltage from the external power supply 12 passes through a filter 17, noise components are removed. Then, a diode bridge DB1 performs full-wave rectification of the AC voltage, and an aluminum electrolytic capacitor C1 smooths the AC voltage. The rectified and smoothed voltage is applied to one end of a primary coil of a transformer T1.

A drain terminal of a field effect transistor (FET) 20 is coupled to the other end of the primary coil of the transformer T1, and a source terminal of the FET 20 is coupled to a minus terminal of the aluminum electrolytic capacitor C1. An input terminal of an integrated circuit (IC) 21 is connected to one end of a tertiary coil of the transformer T1, and the IC 21 generates an on/off control signal and supplies the on/off control signal to a gate terminal of the FET 20. As the FET 20 starts switching operation, electric energy is induced in the secondary coil of the transformer T1 to generate a high frequency voltage.

A diode D1 and an aluminum electrolytic capacitor C2 rectify and smooth the high frequency voltage to generate a DC voltage of 24 V.

Furthermore, the DC-DC converter 30 coupled to the aluminum electrolytic capacitor C2 generates a DC voltage of 5 V from the DC voltage of 24 V.

DC-DC Converter

The DC-DC converter 30 (a transformer) is a non-insulated step-down DC-DC converter and generates a DC voltage (voltage Vo) from the DC voltage (24 V) supplied from the AC-DC converter 16 to a transformation unit 33. The DC voltage generated by the DC-DC converter 30 is supplied to the cooling fan 13 (an air-cooling fan).

In addition to a power supply line (+/GND), the cooling fan 13 includes, for example, a signal line for outputting a lock detection signal as a signal line for outputting a reference signal indicating the presence or absence of abnormality and outputs the lock detection signal to the control unit 40. The lock detection signal switches from a normal level, which is, for example, low (L) level, to a level indicating locking, which is, for example, high (H) level, as described in JP-2005-256617-A, in the following cases. For example, the lock detection signal switches when a motor 13M of the cooling fan 13 does not rotate by a predetermined amount despite the voltage being applied to a power supply line of the motor, or when the motor is in a stopped state. The predetermined amount can be stored in a memory, for example, by a manufacturer based on empirical data.

Transformation Unit

The output terminal of a controller 31 of the DC-DC converter 30 is coupled to one end of a resistor R1 of the transformation unit 33 so that the output voltage is divided by the resistors R1 and R2. The other end of the resistor R1 is coupled to the gate terminal of a transistor Q1 (n-ch FET). The controller 31 can be either of the power supply 10 and the image forming apparatus 1. The source terminal of the transistor Q1 is grounded to a ground GND, and the drain terminal is coupled, via serially connected resistors R3 and R4, to the output terminal (to output DC voltage of 24 V) of the AC-DC converter 16.

The connection point of the resistors R3 and R4 is coupled to the gate terminal of a transistor Q2 (p-ch FET). The source terminal thereof is coupled to the cathode terminal of a diode D2 so as to be coupled to the ground GND via the anode terminal of the diode D2.

The drain terminal of the transistor Q2 is coupled to the other end of the resistor R4 and the DC voltage (24 V) output terminal of the AC-DC converter 16.

Further, the source terminal of the transistor Q2 is coupled to one end of a coil L1, and the other end of the coil L1 is grounded to the ground GND via a capacitor C3. The connection point of the other end of the coil L1 and the capacitor C3 is coupled to an output terminal OUT connected to the cooling fan 13 and is coupled to one end of a voltage sensor 35. The other end of the voltage sensor 35 is grounded to the ground GND, and the output terminal of the voltage sensor 35 is coupled to the input terminal of an analog-to-digital (A/D) converter 31$d$ of the controller 31.

Operation of Transformation Unit

When a pulse-width modulation (PWM) signal output from the output terminal of the controller 31 is at the high level, the transistor Q1 is turned on. Accordingly, the portion between the drain and the source is at the ground level, and the connection point of the resistors R3 and R4 is at the low level. That is, the voltage applied to the gate terminal of the transistor Q2 is lower than the voltage applied to the source terminal of the transistor Q2, and the transistor Q2 is turned on.

By contrast, when the PWM signal is at the low level, the transistor Q1 is turned off. Accordingly, the portion between the drain and the source is opened, and the connection point of the resistors R3 and R4 becomes the high level. That is, the voltage applied to the source terminal of the transistor Q2 becomes substantially the same high level as the voltage applied to the gate terminal of the transistor Q2, and the transistor Q2 is turned off.

While the transistor Q2 is on, the current from the DC voltage (24 V) of the AC-DC converter 16 charges the capacitor C3 between the drain and the source, via the coil L1, and an output current Io is supplied.

At this time, the current flowing through the coil L1 generates a magnetic field, and the electric energy is converted into a magnetic energy and accumulated in the coil L1.

By contrast, while the transistor Q2 is off, the diode D2 is on, and the energy accumulated in the coil L1 is released to the output terminal OUT.

Controller

The controller 31 includes a central processing unit (CPU) 31a, a read only memory (ROM) 31b, a random access memory (RAM) 31c, and the A/D converter 31d.

The CPU 31a controls overall operation of the image forming apparatus 1 with the RAM 31c as a work memory according to a program stored in advance in the ROM 31b.

The ROM 31b is a read-only, non-volatile storage medium that stores firmware and various kinds of data.

The RAM 31c is a volatile storage medium capable of high-speed reading and writing of information. The RAM 31c is available as a work memory.

The A/D converter 31d converts the signal of output value Vo, which is an analog electrical signal input from the voltage sensor 35, to a digital data value. Then, the A/D converter 31d outputs the output voltage to the CPU 31a.

The CPU 31a reads an operating system (OS) from the ROM 31b to be developed in the RAM 31c and boots up the OS. Then, under the management of the OS, the CPU 31a reads a program (a processing module) of the application software from the ROM 31b and executes various processes, thereby implementing the control unit 40 illustrated in FIG. 3.

Functional Configuration

Figure 3:
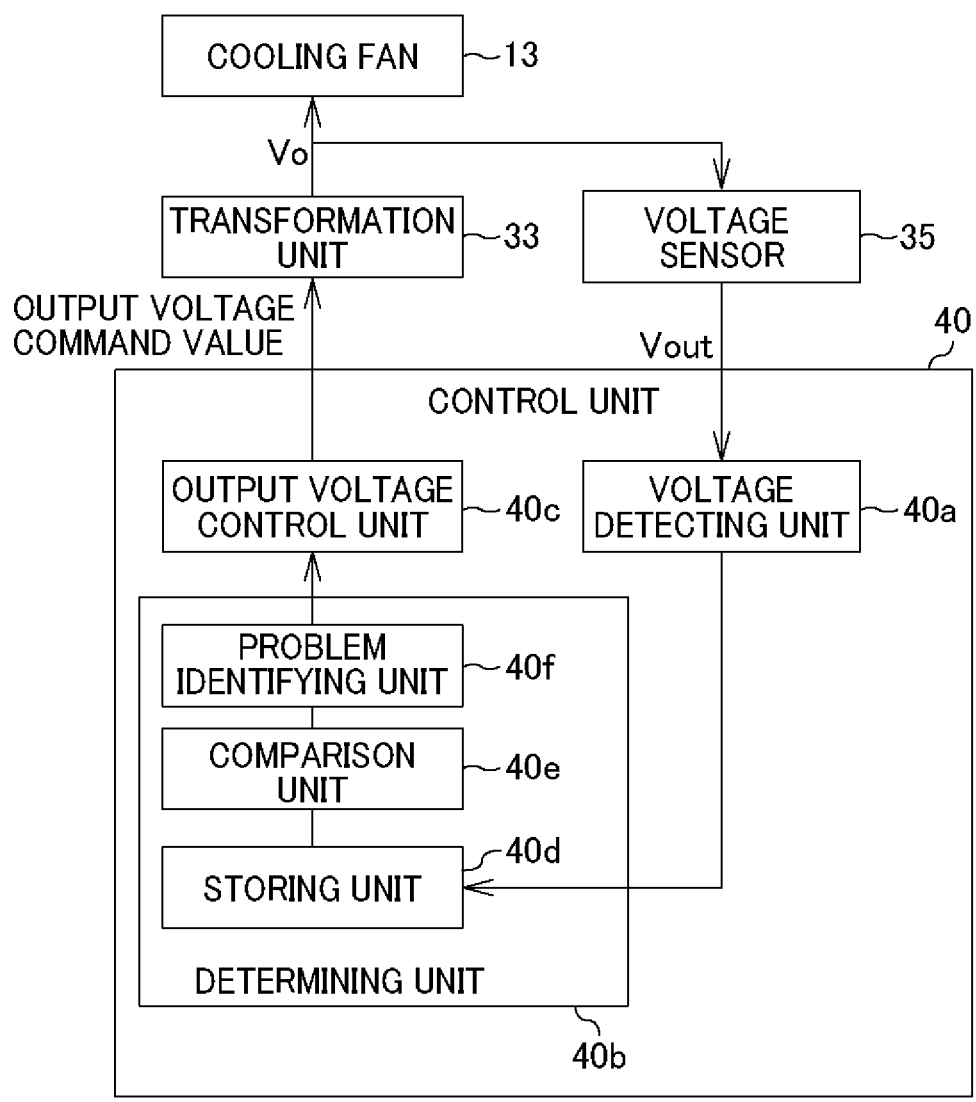
FIG. 3 is a block diagram illustrating a basic power supply configuration according to an embodiment.

FIG. 3 is a block diagram illustrating a basic power supply configuration according to the present embodiment.

In accordance with the PWM signal supplied from the control unit 40, the transformation unit 33 converts the DC voltage (24 V) supplied from the AC-DC converter 16 to a DC voltage and supplies the DC voltage (voltage Vo) to the cooling fan 13.

The voltage sensor 35 reads the output voltage supplied from the transformation unit 33 to the cooling fan 13 and outputs a signal to a voltage detecting unit 40a.

Based on the signal supplied from the voltage sensor 35, the voltage detecting unit 40a converts the signal into voltage data with the A/D converter 31d, to detect the voltage value of the DC voltage Vo output from the transformation unit 33. The voltage detecting unit 40a supplies a detected voltage value Vout of the output voltage to a determining unit 40b.

The determining unit 40b includes a storing unit 40d, a comparison unit 40e, and a failure identifying unit 40f.

When an output voltage control unit 40c performs droop control of the output voltage, the determining unit 40b compares, with a threshold in a state without a failure (hereinafter "failure-free state"), an average value per predetermined unit time or an amplitude value of the output voltage supplied from the transformation unit 33 to the cooling fan 13 (load). Thus, the determining unit 40b determines whether or not a failure has occurred in either the cooling fan 13 or the transformation unit 33. The predetermined unit time can be stored in a memory, for example, by a manufacturer based on empirical data.

The determining unit 40b identifies a failure mode based on the comparison result generated by the comparison unit 40e and the lock detection signal acquired from the cooling fan 13 and identifies an electronic component being in the failure mode. Specifically, based on the lock detection signal acquired from the cooling fan 13, the determining unit 40b identifies the failure mode. Further, the determining unit 40b causes the output voltage control unit 40c to limit the drive mode of the cooling fan 13 so as not to stop the cooling fan 13 uniformly against different types of electronic component failures of the transformation unit 33.

The determining unit 40b displays a message relating to the identified failure mode on the control panel 11.

The storing unit 40d stores the amplitude value and the average per unit time of the voltage value acquired by the voltage detecting unit 40a.

The comparison unit 40e compares the average per unit time of the voltage value acquired from the storing unit 40d with the threshold in the failure-free state. The comparison unit 40e further compares the amplitude value of the voltage value acquired from the storing unit 40d with the threshold in the failure-free state.

Based on the result of comparison with the threshold, generated by the comparison unit 40e, the failure identifying unit 40f identifies a failure of the cooling fan 13 and identifies which of the electronic components of the transformation unit 33 has the failure.

The failure identifying unit 40f identifies whether the location of the failure is in the cooling fan 13 or any one of the electronic components when the control panel 11 accepts the designation of the operation mode.

The output voltage control unit 40c can set the duty cycle of the PWM signal, which is the control signal, to a desired value, thereby controlling the voltage Vo (output voltage) supplied to the cooling fan 13. Hereinafter, the cooling fan 13 may be simply referred to as "fan".

Using the PWM signal generated by the output voltage control unit 40c, the control unit 40 changes the duty cycle of the PWM signal to a plurality of patterns and reads the voltage Vo supplied to the cooling fan 13 obtained in each case with the voltage sensor 35. Then, the control unit 40 calculates the average value and the amplitude from the value after A/D conversion and stores the calculated values in the storing unit 40b. The control unit 40 compares the voltage value stored in the storing unit 40b with the voltage value in the failure-free state to identify the component having the failure.

Supply Voltage to Fan in Failure-Free State

Figure 4A:
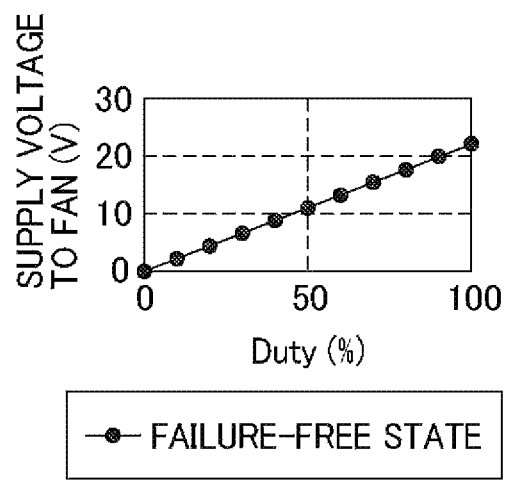
FIG. 4A is a graph illustrating example characteristics of voltage supplied to a cooling fan in a failure-free state.
Figure 4B:
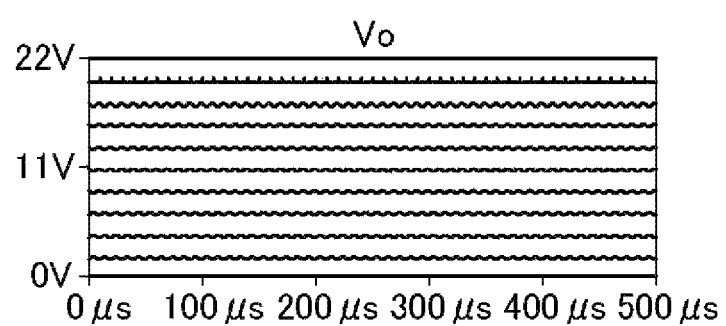
FIG. 4B is a graph illustrating an example waveform of the voltage supplied to the cooling fan in the failure-free state.

FIG. 4A is a graph illustrating the voltage Vo supplied to the cooling fan 13 in the failure-free state, and FIG. 4B is a graph illustrating the waveform of the voltage Vo supplied to the cooling fan 13 in the failure-free state.

FIGS. 4A and 4B illustrate the characteristics of the voltage Vo supplied to the cooling fan 13 in a normal state where the components of the circuit illustrated in FIG. 2 have no failure and the cooling fan 13 (a circuit load) has no failure. FIG. 4A illustrates how the voltage value Vout acquired with the voltage sensor 35 increases as the duty cycle of the PWM signal is increased, and FIG. 4B illustrates the amplitude of the voltage Vo supplied to the cooling fan 13 when the duty cycle is set to each of the values presented in FIG. 4B.

Descriptions are given below of output voltage waveforms conceivable in each failure mode.

Failure Mode: Open Circuit of Diode D2

Figure 5A:
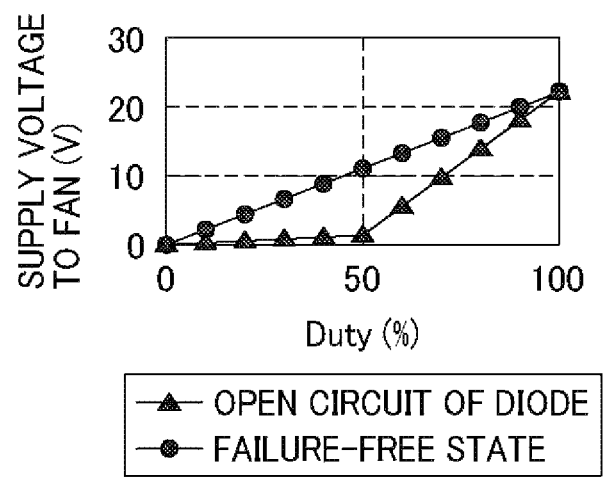
FIG. 5A is a graph illustrating example characteristics of the voltage supplied to the cooling fan under an open circuit of a diode.
Figure 5B:
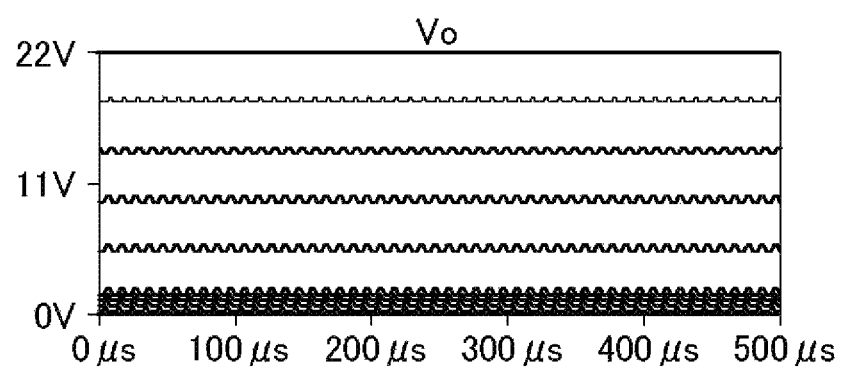
FIG. 5B is a graph illustrating an example waveform of the voltage supplied to the cooling fan under the open circuit of the diode.

FIG. 5A is a graph illustrating the voltage Vo supplied to the cooling fan 13 at the time of open circuit of the diode D2, and FIG. 5B is a graph illustrating the waveform of the voltage Vo supplied to the cooling fan 13 at the time of open circuit of the diode D2.

FIG. 5A illustrates characteristics of the voltage Vo supplied to the cooling fan 13 at the time of open circuit of diode D2.

FIG. 5A illustrates the characteristic of an average value of the voltage Vo supplied to the cooling fan 13 with respect to the duty cycle of the PWM signal. When an open circuit occurs in the diode D2, the voltage value obtained is lower compared with the voltage value in the failure-free state. FIG. 5B illustrates the waveform and the amplitude of the voltage Vo supplied to the cooling fan 13 when the duty cycle is set to each of the values presented in FIG. 5B. When the diode D2 is open-circuited, the circuit fails to regenerate the counter electromotive force generated in the coil L1 when the transistors Q1 (n-ch FET) and Q2 (p-ch FET) are off. As a result, the counter electromotive voltage of the coil L1 is restricted, and the supply voltage Vo after smoothing an inductance-capacitance (LC) circuit becomes lower than the value in the failure-free state.

As illustrated in FIG. 5B, the amplitude is similar to the amplitude in the failure-free state.

Failure Mode: Short Circuit in Coil L1

Figure 6A:
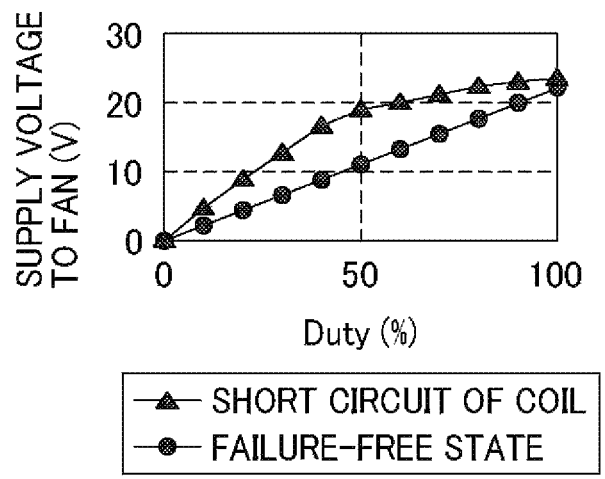
FIG. 6A is a graph illustrating example characteristics of the voltage supplied to the cooling fan under a short circuit of a coil.
Figure 6B:
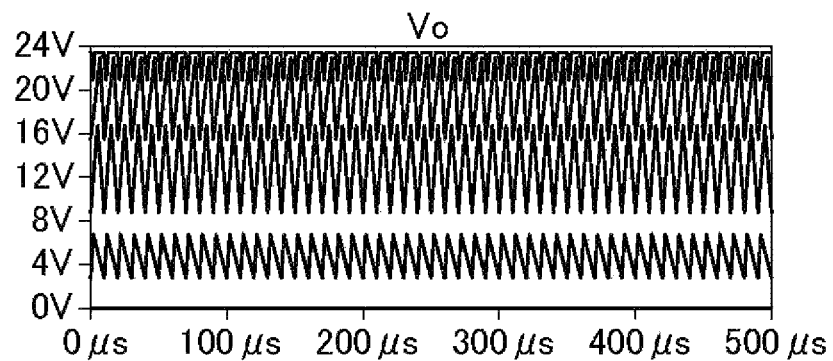
FIG. 6B is a graph illustrating an example waveform of the voltage supplied to the cooling fan under the short circuit of the coil.

FIG. 6A is a graph illustrating the voltage Vo supplied to the cooling fan 13 when the coil L1 is short-circuited, and FIG. 6B is a graph illustrating the waveform of the voltage Vo supplied to the cooling fan 13 when the coil L1 is short-circuited.

FIG. 6A illustrates characteristics of the voltage Vo supplied to the cooling fan 13 in the case where short-circuit occurs in the coil L1.

FIG. 6A illustrates the characteristic of the average value of the voltage Vo supplied to the cooling fan 13 with respect to the duty cycle of the PWM signal. When short-circuit occurs in the coil L1, the voltage obtained is higher compared with the voltage value in the failure-free state. This is because the amount of change over time of the output current increases when the coil L1 is short-circuited.

$$V = L*(di/dt) \quad \text{Formula 1}$$

According to Formula 1, the value expressed as di/dt increases as the coil L1 is short-circuits (inductance L becomes 0).

As a result, the current ripple increases, and the current becomes discontinuous. Accordingly, the output voltage is becomes higher compared with the value in the failure-free state.

FIG. 6B illustrates the waveform and the amplitude of the voltage Vo supplied to the cooling fan 13 when the duty cycle is set to each of the values presented in FIG. 6B. As illustrated in FIG. 6B, the amplitude becomes larger compared with the failure-free state. This is because the ripple occurs in the voltage Vo supplied to the cooling fan 13 as the ripple of the coil current increases.

Failure Mode: Open Circuit of Capacitor C3

Figure 7A:
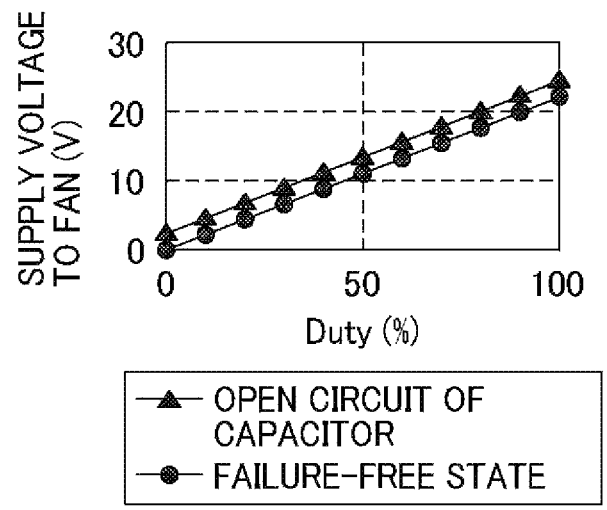
FIG. 7A is a graph illustrating example characteristics of the voltage supplied to the cooling fan under an open circuit of a capacitor.
Figure 7B:
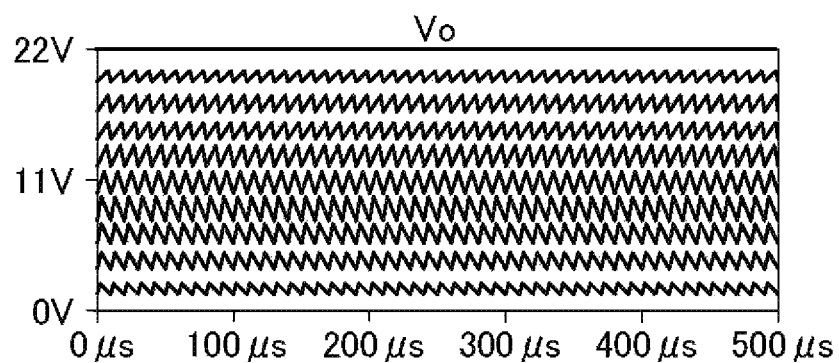
FIG. 7B is a graph illustrating an example waveform of the voltage supplied to the cooling fan under the open circuit of the capacitor.

FIG. 7A is a graph illustrating the voltage Vo supplied to the cooling fan 13 under open circuit of the capacitor C3, and FIG. 7B is a graph illustrating the voltage waveform supplied to the fan under open circuit of the capacitor C3.

FIG. 7A illustrates the characteristic of the voltage Vo supplied to the cooling fan 13 when the capacitor C3 is open-circuited.

FIG. 7A illustrates the characteristic of the average value of the voltage Vo supplied to the cooling fan 13 with respect to the duty cycle of the PWM signal. The average value of the voltage Vo supplied to the cooling fan 13 at the time of open circuit of the capacitor C3 does not change compared with the failure-free state.

FIG. 7B illustrates the amplitude of the voltage Vo supplied to the cooling fan 13 when the duty cycle is set to each of the values presented in the drawing. The voltage amplitude increases compared with the failure-free state. When the capacitor C3 has an open circuit, the LC filter fails to fulfill the cutoff function. Accordingly, voltage ripple (high frequency component) is not fully removed. As a result, the amplitude of the voltage measured by the voltage sensor 35 increases.

Failure Mode: Short Circuit in Cooling Fan

Figure 8A:
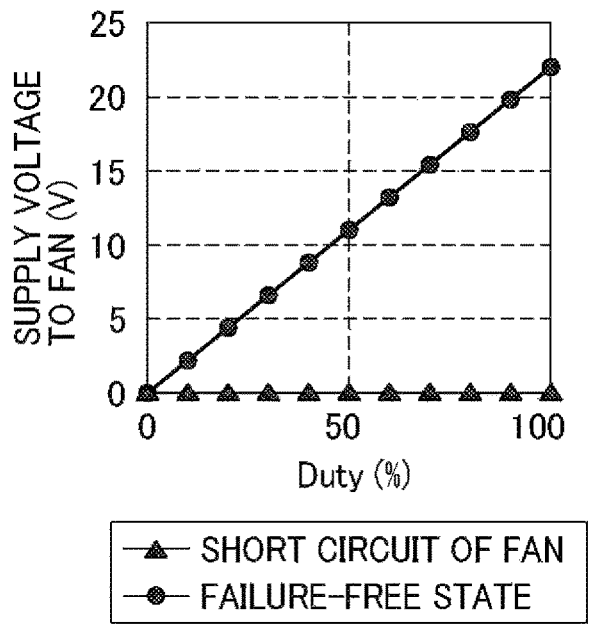
FIG. 8A is a graph illustrating an example waveform of the voltage supplied to the cooling fan under a short circuit of the cooling fan.
Figure 8B:
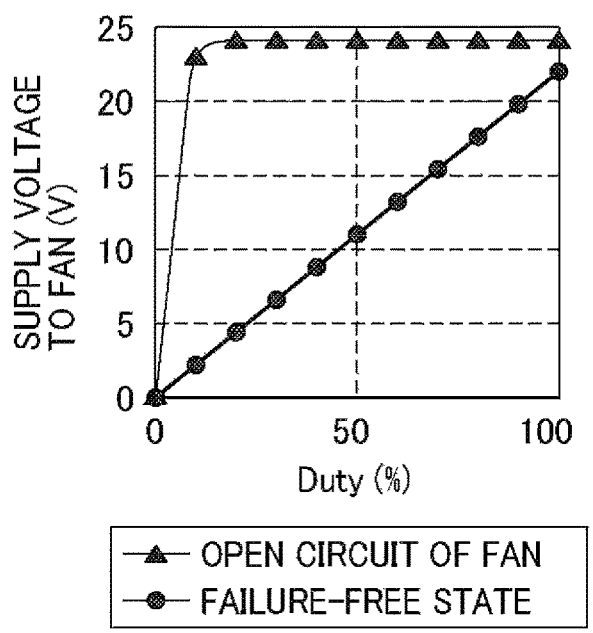
FIG. 8B is a graph illustrating an example waveform of the voltage supplied to the cooling fan in an open circuit of the cooling fan.

FIG. 8A is a graph illustrating a waveform of the output voltage supplied to the cooling fan 13 having a short circuit, and FIG. 8B is a graph illustrating a waveform of voltage supplied to the cooling having an open circuit.

FIG. 8A illustrates the characteristic of the voltage supplied to the cooling fan 13 having the short circuit.

In FIG. 8A, regardless of the duty cycle of the control signal, the voltage value acquired with the voltage sensor 35 is zero. This is because when the cooling fan 13 suffers a short circuit, the voltage value read by the voltage sensor 35 is always at the ground level.

Failure Mode: Open Circuit of Cooling Fan

FIG. 8B is a graph illustrating characteristics of the output voltage supplied to the cooling fan 13 having an open circuit.

In FIG. 8B, regardless of the duty cycle of the PWM signal, the voltage value acquired with the voltage sensor 35 is at the level of the power supply voltage. This is because when the cooling fan 13 suffers an open circuit, the load current becomes zero, and the DC-DC converter 30 enters the discontinuous mode. Then, the voltage supplied to the cooling fan 13 becomes equal to the power supply voltage.

Operation

Figure 9B:
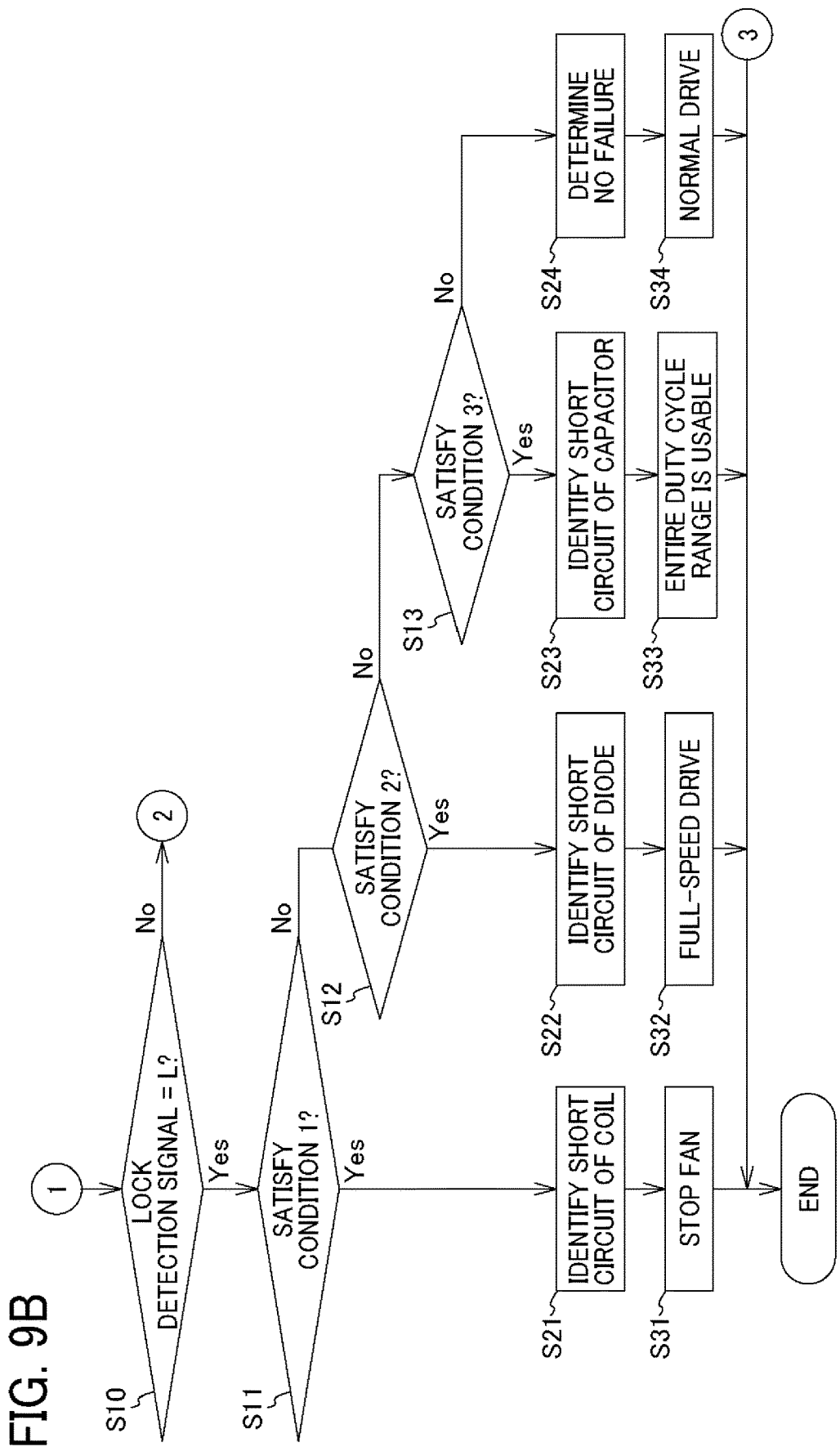
Figure 9C:
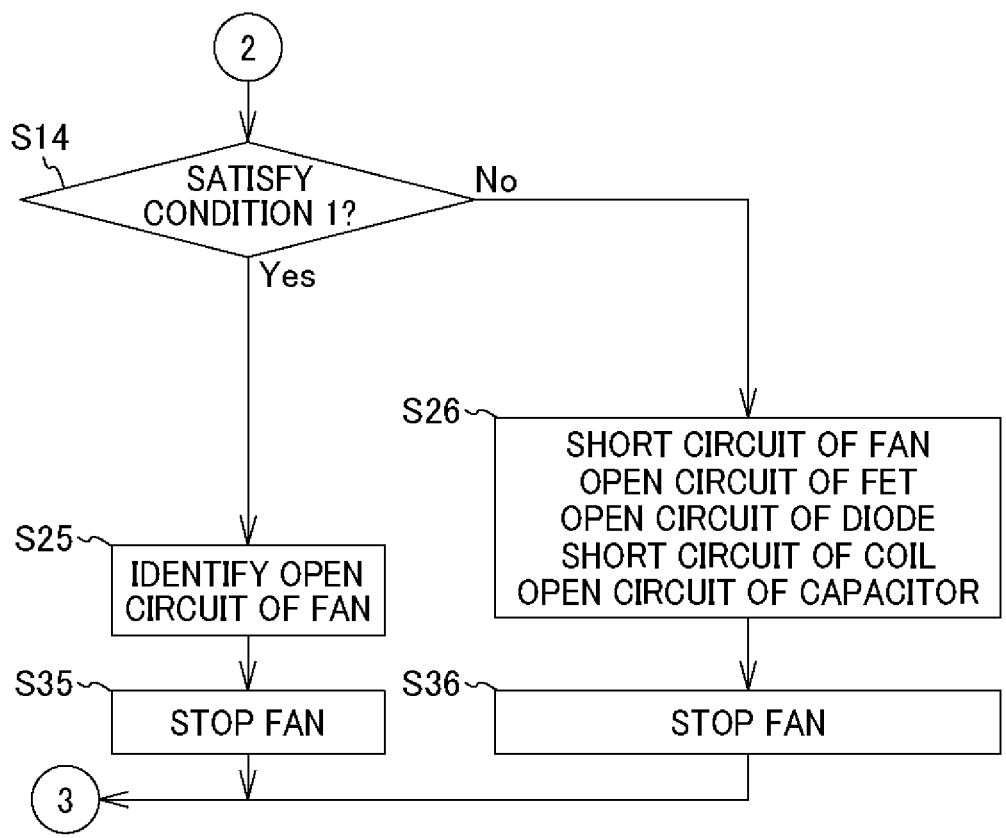

FIGS. 9A, 9B, and 9C are flowcharts illustrating the operation of the DC-DC converter which is the power supply according to the present embodiment.

In the example described below, the control unit 40 performs droop control of the output voltage. That is, as the operation proceeds from S1 to S4 and further to S7, the control unit 40 lowers the duty cycle of the PWM signal. For this reason, values A, B, and C of the duty cycle of the PWM signal described below are in a relationship defined as A>B>C.

In S1, the control unit 40 sets the duty cycle of the PWM signal to A % and outputs the PWM signal to the transformation unit 33.

In S2, the control unit 40 performs analog to digital conversion of the voltage input from the voltage sensor 35 to acquire the voltage value Vout of the output voltage supplied to the cooling fan 13 (hereinafter simply "supply voltage"). At that time, the control unit 40 acquires a plurality of voltage values Vout (for example, 16 samples) of the supply voltage Vo during an infinitesimal time Δt. The number of voltage values Vout acquired is represented as "N".

In S3, the control unit 40 calculates an amplitude Vamp_A of the voltage value Vout of the supply voltage Vo and the time average value Vave_A of the voltage value Vout of the supply voltage Vo and stores the calculated values in the storing unit 40*b*.

At this time, the control unit 40 subtracts a minimum value Vout_min from a maximum value Vout_max among the N voltage values Vout1 to VoutN of the supply voltage to the fan and uses the calculated value as the amplitude Vamp_A.

$$Vamp\_A = Vout\_max - Vout\_min \quad \text{Formula 2}$$

Further, the control unit 40 divides, by N, the sum of the N voltage values Vout1 to VoutN of the supply voltage to the fan to calculate a time average value Vave_A.

$$Vave\_A = (Vout1 + \ldots + VoutN)/N \quad \text{Formula 3}$$

In S4, the control unit 40 sets the duty cycle of the PWM signal to B % and outputs the PWM signal to the transformation unit 33.

In S5, the control unit 40 performs analog to digital conversion of the voltage input from the voltage sensor 35 to acquire the voltage value Vout of the supply voltage Vo.

In S6, the control unit 40 calculates an amplitude Vamp_B of the voltage value Vout of the supply voltage Vo and the time average value Vave_B of the voltage value Vout of the supply voltage Vo and stores the calculated values in the storing unit 40*b*.

In S7, the control unit 40 sets the duty cycle of the PWM signal to C % and outputs the PWM signal to the transformation unit 33.

In S8, the control unit 40 performs analog to digital conversion of the voltage input from the voltage sensor 35 to acquire the voltage value Vout of the supply voltage Vo.

In S9, the control unit 40 calculates an amplitude Vamp_C of the voltage value Vout of the supply voltage Vo and the time average value Vave_C of the voltage value Vout of the supply voltage Vo and stores the calculated values in the storing unit 40*b*.

From the operation from S1 to S9, contents of Table 1 below can be acquired.

In Table 1, the duty cycle of the PWM signal, the amplitude Vamp of the supply voltage Vo, and the time average value Vave of the supply voltage Vo are stored, corresponding to each record number.

TABLE 1

| Record number | Duty cycle (%) | Vamp | Vave |
| --- | --- | --- | --- |
| 1 | A | Vamp_A | Vave_A |
| 2 | B | Vamp_B | Vave_B |
| 3 | C | Vamp_C | Vave_C |

Since the control unit 40 performs droop control of the output voltage, the duty cycle of the PWM signal is in the relation expressed as A>B>C.

In S10, the control unit 40 determines whether or not the lock detection signal of the cooling fan 13 is at the low level (L). In response to a determination that the lock detection signal is at the low level, the operation of the control unit 40 proceeds to S11.

By contrast, in S10, in response to the determination that the lock detection signal (of locking of the cooling fan 13) is not at the low level, the operation of the operation of the control unit 40 proceeds to S14.

Determination of Short Circuit in Coil L1

In S11, the control unit 40 compares the time average values of the supply voltage Vo in magnitude with the value in the failure-free state. The control unit 40 determines whether or not the time average values Vave_A, Vave_B, and Vave_C acquired from the storing unit 40*b* satisfy Condition 1 below.

Condition 1: the time average value Vave_A is greater than the threshold A in the failure-free state, the time average value Vave_B is greater than the threshold A in the failure-free state, and the time average value Vave_C is greater than the threshold A in the failure-free state. When Condition 1 is satisfied, that is, the time average values Vave_A, Vave_B, and Vave_C are larger than the threshold A in the failure-free state, at S21, the control unit 40 determines that the coil L1 is in the short circuit failure.

In S31, the control unit 40 stops the cooling fan 13 in response to the determination that the coil L1 is in the short circuit failure.

When Condition 1 is not satisfied, that is, in response to the determination that the time average values Vave_A, Vave_B, and Vave_C are not greater than the threshold A in the failure-free state, the operation of the control unit 40 proceeds to S12.

According to the present embodiment, the determining unit 40*b* identifies the failure mode based on the comparison result generated by the comparison unit 40*e* and the lock detection signal acquired from the cooling fan 13. The determining unit 40*b* further identifies the electronic component having the failure. Thus, the failure can be identified with a simple configuration. Specifically, the control unit 40 considers the lock detection signal of the cooling fan 13, thereby identifying of the short circuit of the coil L1.

Determination of Open Circuit of Diode D2

In S12, the control unit 40 compares the time average values of the supply voltage Vo in magnitude with the value in the failure-free state. The control unit 40 determines whether or not the time average values Vave_A, Vave_B, and Vave_C acquired from the storing unit 40*b* satisfy Condition 2.

Condition 2: the time average value Vave_A is smaller than the threshold A in the failure-free state, the time average value Vave_B is smaller than the threshold A in the failure-free state, and the time average value Vave_C is smaller than the threshold A in the failure-free state. When Condition 2 is satisfied, that is, the time average values Vave_A, Vave_B, and Vave_C are smaller than the threshold A in the failure-free state, at S22, the control unit 40 determines that the diode D2 is in the open circuit failure.

In S32, the control unit 40 limits the drive mode to full speed drive in response to the determination that the diode D2 is in the open circuit fault.

By contrast, when Condition 2 is not satisfied, that is, in response to the determination that the time average values Vave_A, Vave_B, and Vave_C are not smaller than the threshold B in the failure-free state, the operation of the control unit 40 proceeds to S13.

According to the present embodiment, the determining unit 40*b* identifies the failure mode based on the comparison result generated by the comparison unit 40*e* and the lock detection signal acquired from the cooling fan 13. The determining unit 40*b* further identifies the electronic component having the failure. Thus, the failure can be identified with a simple configuration. Specifically, the control unit 40 considers the lock detection signal of the cooling fan 13, thereby determining that the failure is the open circuit of the diode D2.

Determination of Open Circuit of Capacitor C3

In S13, the control unit 40 compares the amplitude of the supply voltage Vo with the amplitude in the failure-free state. The control unit 40 determines whether or not the amplitudes Vamp_A, Vamp_B, and Vamp_C acquired from the storing unit 40b satisfy Condition 3.

Condition 3: the amplitude Vamp_A is greater than the threshold A in the failure-free state, the amplitude Vamp_B is greater than the threshold A in the failure-free state, and the amplitude Vamp_C is greater than the threshold A in the failure-free state. When Condition 3 is satisfied, that is, the amplitudes Vamp_A, Vamp_B, and Vamp_C are greater than the threshold A in the failure-free state, in S23, the control unit 40 determines that the capacitor C3 is in the open circuit fault.

According to the present embodiment, the determining unit 40b identifies the failure mode based on the comparison result generated by the comparison unit 40e and the lock detection signal acquired from the cooling fan 13. The determining unit 40b further identifies the electronic component having the failure. Thus, the failure can be identified with a simple configuration. Specifically, the control unit 40 considers the lock detection signal of the cooling fan 13, thereby identifying the open circuit of the capacitor C3.

In S33, the control unit 40 can use the entire duty cycle range at the time of the open circuit of the capacitor C3.

By contrast, when Condition 3 is not satisfied, that is, in response to the determination that the amplitudes Vamp_A, Vamp_B, and Vamp_C are not greater than the threshold A in the failure-free state, the control unit 40 determines that there is no failure in S24.

In S34, the control unit 40 can use the entire duty cycle range, and the apparatus operates normally.

Determination of Open Circuit of Cooling Fan 13

In S14, the control unit 40 compares the time average values of the supply voltage Vo in magnitude with the value in the failure-free state. The control unit 40 determines whether or not the time average values Vave_A, Vave_B, and Vave_C acquired from the storing unit 40b satisfy Condition 1 presented above.

When Condition 1 is satisfied, that is, in response to the determination that the time average values Vave_A, Vave_B, and Vave_C are larger than the threshold A in the failure-free state, the control unit 40 determines that the cooling fan 13 is in the open circuit fault in S25.

In S35, the control unit 40 stops the generation of the PWM signal and stops driving the cooling fan 13.

According to the present embodiment, the determining unit 40b identifies the failure mode based on the comparison result generated by the comparison unit 40e and the lock detection signal acquired from the cooling fan 13. The determining unit 40b further identifies the electronic component having the failure. Thus, the failure can be identified with a simple configuration. Specifically, the control unit 40 considers the lock detection signal of the cooling fan 13, thereby identifying of the open circuit of the cooling fan 13.

By contrast, when Condition 1 is not satisfied, that is, in response to the determination that the time average values Vave_A, Vave_B, and Vave_C are not larger than the threshold A in the failure-free state, in S26, the control unit 40 does not identify the faulty component but determines that there is a component having a failure.

In S36, the control unit 40 stops the generation of the PWM signal and stops driving the cooling fan 13.

When the failure mode is identified in S21, S22, S23, and S24, the control unit 40 displays a message, such as "the coil L1 is out of order", relating to the identified failure mode, on the control panel 11.

According to the present embodiment, the failure identifying unit 40f identifies whether the failure is in the cooling fan 13 or any one of the electronic components when the control panel 11 accepts the designation of the operation mode. Thus, the failure can be identified with a simple configuration.

According to the present embodiment, as the determining unit 40b displays the message relating to the identified failure mode on the control panel 11, a user or operator can confirm which of the electronic components has the failure.

According to the present embodiment, the determining unit 40b identifies the failure mode based on the lock detection signal acquired from the cooling fan 13 and causes the output voltage control unit 40c to limit the drive mode of the cooling fan 13 so as not to stop the cooling fan 13 uniformly against the failures of the electronic components of the transformation unit 33.

Specifically, when the short-circuit of the coil L1 occurs, the control unit 40 stops the cooling fan 13. When the open circuit of the diode D2 occurs, the control unit 40 limits the drive mode of the cooling fan 13 to full speed drive. Furthermore, when the open circuit of the capacitor C3 occurs, the control unit 40 can use the entire duty range of the PWM signal. With such control operation, even if a failure occurs in the electronic component, the cooling fan 13 can continue the operation with the function of the power supply 10 limited. Thus, downtime of the cooling fan 13 can be reduced.

According to the present embodiment, the following effects are available.

During droop control of the output voltage by the output voltage control unit 40c, the determining unit 40b compares either an average value of an output voltage supplied per unit time from the transformation unit 33 to the cooling fan 13 or an amplitude of the output voltage with a threshold in the failure-free state, thereby determining whether or not a failure has occurred in the cooling fan 13 or a transformation unit 33. Accordingly, compared with a method in which the output voltage and increases in the output current are compared with respective threshold using respective sensors, failure determination can be available with a simple configuration. As a result, the cost of the power supply 10 can be reduced.

Further, based on the comparison result generated by the comparison unit 40e, the failure identifying unit 40f determines the failure of the cooling fan 13 and identifies the electronic component having the failure in the transformation unit 33. Accordingly, the failure can be determined with a simple configuration.

The embodiments described above are examples, and aspects of the present disclosure attain effects and advantages as described below.

Aspect 1

The power supply 10 includes the transformation unit 33 configured to supply an output voltage, which is transformed from a DC voltage, to the cooling fan 13 (a load), and the output voltage control unit 40c configured to control the output voltage from the transformation unit 33. The power supply 10 further includes the determining unit 40b. While the output voltage control unit 40c performs droop control of the output voltage, the determining unit 40b compares, with the threshold in the no-failure state, the average value per predetermined time of the output voltage supplied from the transformation unit 33 to the cooling fan 13 or the amplitude value and determines whether a failure has occurred in the cooling fan 13 or the transformation unit 33.

According to this aspect, when the output voltage control unit 40c controls drooping of the output voltage, the determining unit 40b can compare the average per unit time or the amplitude value of the output voltage supplied from the transformation unit 33 to the cooling fan 13 with the threshold in the failure-free state, thereby determining whether a failure with a simple configuration by judging whether or not a failure has occurred in the cooling fan 13 or the transformation unit 33. Thus, the determining unit 40b can determine the failure with a simple configuration. As a result, the cost of the power supply 10 can be reduced.

Aspect 2

The power supply 10 includes the voltage detecting unit 40a that detects a voltage value of the voltage supplied from the transformation unit 33 to the cooling fan 13. The determining unit 40b includes the storing unit 40d configured to store the average per unit time of the voltage value acquired by the voltage detecting unit 40a, the comparison unit 40e configured to compare the average per unit time of the voltage value acquired from the storing unit 40d with the threshold in the failure-free state, and the failure identifying unit 40f configured to identify the failure of the cooling fan 13 and identify the electronic component of the transformation unit 33 having the failure, based on the comparison result generated by the comparison unit 40e.

According to this aspect, the failure identifying unit 40f identifies, based on the comparison result generated by the comparison unit 40e, the failure of the cooling fan 13 and determines which of the electronic components of the transformation unit 33 has the failure. Thus, the failure can be determined with a simple configuration.

Aspect 3

The power supply 10 includes the voltage detecting unit 40a that detects a voltage value of the voltage supplied from the transformation unit 33 to the cooling fan 13. The determining unit 40b includes the storing unit 40d configured to store the amplitude value of the voltage value acquired by the voltage detecting unit 40a, the comparison unit 40e configured to compare the amplitude value of the voltage value acquired from the storing unit 40d with the threshold in the failure-free state, and the failure identifying unit 40f configured to identify the failure of the cooling fan 13 and identify the electronic component of the transformation unit 33 having the failure, based on the comparison result generated by the comparison unit 40e.

According to this aspect, the failure identifying unit 40f identifies, based on the comparison result generated by the comparison unit 40e, the failure of the cooling fan 13 and determines which of the electronic components of the transformation unit 33 has the failure. Thus, the failure can be determined with a simple configuration.

Aspect 4

The cooling fan 13 to which the voltage is supplied form the power supply 10 is a cooling fan that outputs a lock detection signal indicating an abnormality of the motor 13M, and the determining unit 40b determines identifies the failure mode and the electronic component having the failure, based on the comparison result generated by the comparison unit 40e and the lock detection signal.

According to this aspect, the determining unit 40b identifies the failure mode based on the comparison result generated by the comparison unit 40e and the lock detection signal acquired from the cooling fan 13. The determining unit 40b further identifies the electronic component having the failure. Thus, the failure can be identified with a simple configuration.

More specifically, based on only the waveform of the supply voltage Vo to the cooling fan 13, only the open circuit of the capacitor C3 can be identified. However, when the lock detection signal of the cooling fan 13 is considered, the open circuit of the cooling fan 13, the short circuit of the coil L1, and the open circuit of the diode D2 can be identified.

Aspect 5

The determining unit 40b identifies the failure mode based on the lock detection signal acquired from the cooling fan 13. Further, the determining unit 40b causes the output voltage control unit 40c to limit the drive of the cooling fan 13 so as not to stop the cooling fan 13 uniformly against failures of different electronic components of the transformation unit 33.

According to this aspect, the determining unit 40b identifies the failure mode based on the lock detection signal acquired from the cooling fan 13 and causes the output voltage control unit 40c to limit the drive of the cooling fan 13 so as not to stop the cooling fan 13 uniformly against the failures of the electronic components of the transformation unit 33.

Specifically, when the short-circuit of the coil L1 occurs, the control unit 40 stops the cooling fan 13. When the open circuit of the diode D2 occurs, the control unit 40 limits the drive mode of the cooling fan 13 to full speed drive. Furthermore, when the open circuit of the capacitor C3 occurs, the control unit 40 can use the entire duty range of the PWM signal. With such control operation, even if a failure occurs in the electronic component, the cooling fan 13 can continue the operation with the function of the power supply 10 limited. Thus, downtime of the cooling fan 13 can be reduced.

Aspect 6

The power supply 10 includes the control panel 11 configured to display a plurality of operation modes relating to the cooling fan 13 and accept designation of any one of the plurality of operation modes. The failure identifying unit 40f identifies whether the location of the failure is in the cooling fan 13 or any one of the electronic components when the control panel 11 accepts the designation of the operation mode.

According to this aspect, the failure identifying unit 40f identifies whether the failure is in the cooling fan 13 or any one of the electronic components when the control panel 11 accepts the designation of the operation mode. Thus, the failure can be identified with a simple configuration.

Aspect 7

The power supply 10 includes the control panel 11, and the determining unit 40b displays a message relating to the identified failure mode on the control panel 11.

According to this aspect, as the determining unit 40b displays the message relating to the identified failure mode on the control panel 11, a user or operator can confirm which one of the electronic components has the failure.

Aspect 8

An image forming apparatus includes the power supply 10 according to any of one of Aspects 1 to 7.

According to this aspect, the image forming apparatus 1 can be provided with the power supply 10 capable of determining a failure with a simple configuration.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A power supply comprising:
a transformer configured to transform a direct current voltage and supply an output voltage to a load; and
circuitry configured to:
control the output voltage from the transformer;
compare one of an average per unit time of the output voltage and an amplitude value of the output voltage with a threshold in a failure-free state when performing droop control of the output voltage; and
determine whether a failure has occurred in at least one of the load and the transformer,
wherein the transformer includes:
a plurality of electronic components; and
a voltage sensor configured to detect the output voltage supplied from the transformer to the load, and
wherein the circuitry is configured to:
store an average per unit time of a voltage value acquired by the voltage sensor:
compare the average per unit time of the voltage value with the threshold in the failure-free state; and
determine, based on a result of comparison with the threshold, which one of the load and the plurality of electronic components has the failure.

2. The power supply according to claim 1, wherein the load is a cooling fan including a motor, the cooling fan configured to output a lock detection signal indicating abnormality of the motor, and
wherein the circuitry is configured to:
identify a failure mode based on the result of comparison with the threshold and the lock detection signal acquired from the cooling fan; and
identify which one of the plurality of electronic components is in the failure mode.

3. The power supply according to claim 2, wherein the circuitry is configured to limit drive of the cooling fan in accordance with the failure mode identified.

4. The power supply according to claim 1, wherein the circuitry is configured to:
store an amplitude value of the voltage value acquired by the voltage sensor;
compare the amplitude value of the voltage value with the threshold in the failure-free state; and
determine which one of the load and the plurality of electronic components has the failure based on a result of comparison with the amplitude value.

5. The power supply according to claim 4, wherein the load is a cooling fan including a motor, the cooling fan configured to output a lock detection signal indicating abnormality of the motor, and
wherein the circuitry is configured to:
identify a failure mode based on the result of comparison with the amplitude value and the lock detection signal acquired from the cooling fan; and
identify which one of the plurality of electronic components is in the failure mode.

6. The power supply according to claim 5, wherein the circuitry is configured to limit drive of the cooling fan in accordance with the failure mode identified.

7. An image forming apparatus comprising:
a load;
a power supply including a transformer configured to transform a direct current voltage and supply an output voltage to the load; and
circuitry configured to:
control the output voltage from the transformer;
compare one of an average per unit time of the output voltage and an amplitude value of the output voltage with a threshold in a failure-free state when performing droop control of the output voltage; and
determine whether a failure has occurred in at least one of the load and the transformer
wherein the transformer includes:
a plurality of electronic components; and
a voltage sensor configured to detect the output voltage supplied from the transformer to the load, and
wherein the circuitry is configured to:
store an average per unit time of a voltage value acquired by the voltage sensor:
compare the average per unit time of the voltage value with the threshold in the failure-free state; and
determine, based on a result of comparison with the threshold, which one of the load and the plurality of electronic components has the failure.

8. The image forming apparatus according to claim 7, further comprising an operation display device configured to display a plurality of operation modes relating to the load and accept designation of one of the plurality of operation modes,
wherein the circuitry is configured to determine which one of the load and the plurality of electronic components has the failure in response to an acceptance of the designation of one of the plurality of operation modes.

9. The image forming apparatus according to claim 7, further comprising an operation display device configured to display a message,
wherein the load is a cooling fan including a motor, the cooling fan configured to output a lock detection signal indicating abnormality of the motor, and
wherein the circuitry is configured to:
identify a failure mode based on the result of comparison with the threshold and the lock detection signal acquired from the cooling fan; and
display a message relating to the identified failure mode on the operation display device.

10. The image forming apparatus according to claim 7, wherein the circuitry is configured to:
store an amplitude value of a voltage value acquired by the voltage sensor;
compare the amplitude value of the voltage value with the threshold in the failure-free state; and
determine which one of the load and the plurality of electronic components has the failure based on a result of comparison with the amplitude value.

11. The image forming apparatus according to claim 10, further comprising an operation display device configured to display a message, wherein the load is a cooling fan including a motor, the cooling fan configured to output a lock detection signal indicating abnormality of the motor, and wherein the circuitry is configured to:
   identify a failure mode based on the result of comparison with the amplitude value and the lock detection signal acquired from the cooling fan; and
   display a message relating to the identified failure mode on the operation display device.

\* \* \* \* \*